US012113952B1

(12) United States Patent
Yang et al.

(10) Patent No.: US 12,113,952 B1
(45) Date of Patent: Oct. 8, 2024

(54) METASURFACE-BASED STRUCTURED LIGHT 3D IMAGING SYSTEM AND METHOD

(71) Applicant: XI'AN CHISHINE OPTOELECTRONICS TECHNOLOGY CO., LTD, Xi'an (CN)

(72) Inventors: Tao Yang, Xi'an (CN); Minyu Bai, Xi'an (CN); Lei Zhao, Xi'an (CN); Shaowei Zhou, Xi'an (CN); Chao Liu, Xi'an (CN); Biao Yang, Xi'an (CN); Fengfeng Hu, Xi'an (CN); Fang Wang, Xi'an (CN)

(*) Notice: Subject to any disclaimer, the term of this patent is extended or adjusted under 35 U.S.C. 154(b) by 0 days.

(21) Appl. No.: 18/574,290

(22) PCT Filed: Sep. 6, 2023

(86) PCT No.: PCT/CN2023/117294
§ 371 (c)(1),
(2) Date: Dec. 26, 2023

(30) Foreign Application Priority Data

Mar. 22, 2023 (CN) .............................. 202310286922

(51) Int. Cl.
*H04N 13/254* (2018.01)
*B82Y 20/00* (2011.01)
(Continued)

(52) U.S. Cl.
CPC ............ *H04N 13/254* (2018.05); *B82Y 20/00* (2013.01); *B82Y 30/00* (2013.01); *B82Y 40/00* (2013.01);
(Continued)

(58) Field of Classification Search
CPC .. H04N 13/254; H04N 13/246; H04N 13/268; H04N 13/271; H04N 13/296;
(Continued)

(56) References Cited

U.S. PATENT DOCUMENTS 6,861,614 B1 * 3/2005 Tanabe .............. H01L 21/02678
438/166
8,209,128 B1 * 6/2012 Gourley ................. G01N 21/47
356/417

(Continued)

FOREIGN PATENT DOCUMENTS

CN 215114433 U 12/2021
CN 114111640 A 3/2022
(Continued)

OTHER PUBLICATIONS

Chi Hanbin; Duan Huigao; Hu Yueqiang, Application of metasurfaces in three-dimensonal imaging and display, Optics and Precision Engineering, vol. 30 No. 15, Aug. 10, 2022, p. 1775-1800, ISSN: 1004-924X.

*Primary Examiner* — Tung T Vo
(74) *Attorney, Agent, or Firm* — Novoclaims Patent Services LLC; Mei Lin Wong (57) ABSTRACT

Disclosed are a metasurface-based structured light 3D imaging system and method, which use a metasurface-based control device to realize high-quality control of a laser beam, use a MEMS micromirror to scan and project the laser beam, and realize high-precision reconstruction of 3D information of the surface of an object together with related structured light design and demodulation methods. The invention realizes fine control of a structured light, improves the quality of a structured light field, reduces laser speckles and improves power, thus improving 3D imaging precision and robustness.

8 Claims, 4 Drawing Sheets

(51) Int. Cl.
  *B82Y 30/00*     (2011.01)
  *B82Y 40/00*     (2011.01)
  *G02B 1/00*      (2006.01)
  *G02B 26/08*     (2006.01)
  *G02B 26/10*     (2006.01)
  *H04N 13/246*    (2018.01)
  *H04N 13/268*    (2018.01)
  *H04N 13/271*    (2018.01)
  *H04N 13/296*    (2018.01)

(52) U.S. Cl.
  CPC ......... *G02B 1/002* (2013.01); *G02B 26/0833* (2013.01); *G02B 26/101* (2013.01); *H04N 13/246* (2018.05); *H04N 13/268* (2018.05); *H04N 13/271* (2018.05); *H04N 13/296* (2018.05)

(58) Field of Classification Search
  CPC ......... B82Y 20/00; B82Y 30/00; B82Y 40/00; G02B 1/002; G02B 26/0833; G02B 26/101
  USPC .......................................................... 348/46
  See application file for complete search history.

(56) References Cited

U.S. PATENT DOCUMENTS

| | | | |
|---|---|---|---|
| 10,841,561 B2 * | 11/2020 | Lee | H04N 13/271 |
| 2005/0040146 A1 * | 2/2005 | Takami | H01L 21/02691 |
| | | | 257/E29.294 |
| 2006/0062268 A1 * | 3/2006 | Saito | G02B 26/123 |
| | | | 372/43.01 |
| 2008/0057718 A1 * | 3/2008 | Omata | B23K 26/0676 |
| | | | 257/E21.247 |
| 2008/0304055 A1 * | 12/2008 | Oshima | G01N 21/9501 |
| | | | 356/237.5 |
| 2012/0092484 A1 * | 4/2012 | Taniguchi | G01N 21/9501 |
| | | | 348/87 |
| 2017/0366801 A1 * | 12/2017 | Horesh | H04N 13/296 |
| 2019/0149804 A1 * | 5/2019 | Sohn | G03B 15/03 |
| | | | 348/46 |
| 2020/0238896 A1 * | 7/2020 | Pang | F21S 41/125 |
| 2020/0251359 A1 * | 8/2020 | Wakabayashi | B23K 26/352 |
| 2020/0290156 A1 * | 9/2020 | Suwa | B23K 26/0622 |
| 2021/0291297 A1 * | 9/2021 | Shimbori | B23K 26/0622 |
| 2021/0304396 A1 * | 9/2021 | Addington | G01B 11/2545 |
| 2023/0196599 A1 * | 6/2023 | Tao | G06V 10/82 |
| | | | 382/154 |

FOREIGN PATENT DOCUMENTS

| | | |
|---|---|---|
| CN | 114877825 A | 8/2022 |
| KR | 20220115534 A | 8/2022 |

* cited by examiner

METASURFACE-BASED STRUCTURED LIGHT 3D IMAGING SYSTEM AND METHOD

BACKGROUND OF THE PRESENT INVENTION

The invention belongs to the field of photoelectric measurement and 3D vision, and particularly relates to a metasurface-based structured light 3D imaging system and method.

DESCRIPTION OF RELATED ARTS

The structured light 3D imaging technique is widely used for 3D modeling, robot navigation, detection and measurement, and other fields because of its high precision and good robustness. A classical structured light 3D imaging system is composed of a structured light projector and a camera with an optical system, wherein the structured light projector projects a pre-designed structured light image or image sequence to the surface of an object, and the camera with the optical system captures a structured light pattern on the surface of the object from another perspective; because of the difference in the angle of view between the structured light image or image sequence and the structured light pattern, the structured light pattern captured by the camera is distorted, which is related with the altitude distribution on the surface of the object; a corresponding calibration and demodulation algorithm can be designed to calculate the altitude distribution on the surface of the object to reconstruct 3D information. Structured lights approximately include dynamic structured light and static structured light. The static structured light reconstructs 3D information by projecting a structured light in a fixed pattern to the surface of an object, can realize single-frame imaging, and is suitable for dynamic imaging of dynamic objects; however, the precision of the static structured light is low. The dynamic structured light reconstructs 3D information by projecting a series of structured light images to the surface of an object, and the precision of the dynamic structured light is far better than that of the static structured light. Therefore, the dynamic structured light is more widely applied to 3D measurement, robot 3D vision, 3D scanning, and other fields with a higher precision requirement.

A typical dynamic structured light 3D imaging system adopts the digital modulation technique represented by DLP, which uses a DMD chip to modulate an LED light source to project a constantly changing structured light field. Similarly, LCDs and LCoS chips also adopt the digital modulation technique and often use a high-voltage mercury lamp as a light source. These 3D imaging systems based on the digital light control technique are good in precision and low in cost, thus achieving a great success. The "MEMS micromirror+laser" projection scheme appearing in recent years witnessed a rapid development because of its capacity to resist ambient light, low power and small size. For example, Patent CN106705889B discloses a generation method for a programmable analog fringe pattern with an extended depth of field, which obtains a collimated Gaussian laser beam meeting requirements by focusing and collimating a laser beam emitted from a laser with a collimating lens. However, the use of a laser source inevitably introduces laser speckles, which compromises the precision to some extent. Due to the use of a single-mode edge-emitting laser, the energy of the light source is limited, making is difficult to further increase the signal to noise ratio and leading to a limited operating distance. For example, how to shape and control the light beam of the laser is of great importance for further mining the precision and robustness of the potential of the MEMS structured light 3D imaging scheme.

The metasurface is a 2D planar structure, which is formed by arranging artificial atoms with a special electromagnetic attribute in a certain manner, can realize flexible control of the amplitude, phase and polarization of incident light, and has a powerful light field control ability, thus receiving extensive attention. Compared with metamaterials, the metasurface breaks through the electromagnetic attribute of traditional materials, and the 2D planar structure of the metasurface overcomes the processing difficulty of the 3D structure of metalmaterials, which facilitates the integration and miniaturization of nano-optical devices. The metasurface has broad application prospects in polarization conversion, holographic imaging, ultra-thin lenses, beam deflection, and other aspects. Therefore, how to apply the powerful light field control ability of the metasurface to 3D imaging gradually becomes a hot research direction.

SUMMARY OF THE PRESENT INVENTION

To overcome the defects of the dynamic structured light in the prior art, the invention aims to provide a metasurface-based structured light 3D imaging system and method, which use a metasurface-based control device to realize high-quality control of a laser beam, use a MEMS micromirror to scan and project the laser beam, and realize high-precision reconstruction of 3D information of the surface of an object together with related structured light design and demodulation methods. The invention realizes fine control of a structured light, improves the quality of a structured light field, reduces laser speckles and improves power, thus improving 3D imaging precision and robustness.

To fulfill the above objective, the invention adopts the following technical solution:

A metasurface-based structured light 3D imaging system is arranged above a target object and at least comprises a metasurface-based structured light projector and a camera system for acquiring a structured light;

the structured light projector comprises a semiconductor laser used as a light source, and a beam homogenizer, a condenser, a cylindrical mirror and a MEMS micromirror are sequentially arranged in front of the semiconductor laser in an incident direction the camera system at least comprises a photosensitive unit and an optical system, forms a complete imaging unit, and synchronously acquires a structured light pattern projected to the surface of the target object;

micro-nano structures, which are fabricated by lithography, electron beam processing or nanoimprint lithography, are arranged on surfaces of the beam homogenizer and the condenser.

The micro-nano structures are formed by discrete nano-unit structural materials; within the infrared band, Ge or Si is used as the unit structural material; within the visible light band, $TiO_2$ or GaN is used as the unit structural material; and within the ultraviolet band, $HfO_2$ or AlN is used as the unit structural material.

The semiconductor laser is either a multi-mode edge-emitting laser EEL or a vertical-cavity surface-emitting laser array (VCSELs).

The MEMS micromirror is an electromagnetically-driven, electrothermally-driven or electrostatically-driven MEMS micromirror.

An imaging method based on the metasurface-based structured light 3D imaging system comprises the following steps:

S1: constructing the metasurface-based structured light 3D imaging system;
S2: designing a structured light projection scheme;
S3: controlling the structured light 3D imaging system to project a structured light, and synchronously acquiring a structured light image; and
S4: complecting feature extraction and 3D reconstruction. Specifically, in S1:

A laser beam generated by the multi-mode edge-emitting laser EEL or the vertical-cavity surface-emitting laser array VCSELs first penetrates through the beam homogenizer, the beam homogenizer a reciprocating tangential translatory motion slightly or rotates around an axial slightly, wherein a motion amplitude ranges from 1 μm to 1000 μm, and a motion frequency ranges from 50 Hz to 5000 Hz; nano-micro structures are arranged on the surface of the beam homogenizer to change a phase and vibration direction of light waves, and after the light waves penetrate through the beam homogenizer, energy is homogenized, and the vibration direction becomes random, such that coherence is destroyed; laser lights enter the condenser after passing through the beam homogenizer, and the condenser converges and shapes the laser lights into a Gaussian beam by means of nano micro-structures on a surface of the condenser; after being stretched by the cylindrical mirror, the Gaussian laser beam forms a uniform laser knife structure, that is, the laser beam is linearly distributed in an x-y plane; the laser beam enters the MEMS micromirror and is then further reflected to the surface of the measured target object, the MEMS micromirror is driven to make simple harmonic motions around an axis to drive laser lights to scan the surface of the object, the brightness of the laser is adjusted synchronously, and the structured light pattern coded in one dimension and distributed in two dimension is projected to the surface of the target object;

the phase of the light waves of the condenser needs to follow the following phase distribution $\varphi_{nf}(x,y)$ to converge the laser lights into a Gaussian laser beam, and the phase distribution required for forming the Gaussian laser beam is:

$$\varphi_{nf}(x, y) = \frac{2\pi}{\lambda}\left(f - \sqrt{x^2 + y^2 + f^2}\right)$$

where, $\varphi_{nf}(x,y)$ is a phase distribution of the Gaussian laser beam, $\lambda$ is a wavelength of an incident light, and f is a focal length. x and y are positional coordinates of a cross-section of the laser beam;

The distribution of the nano-units is designed to realize the phase distribution $\varphi_{nf}(x,y)$ to converge the laser lights into the Gaussian laser beam.

The invention has the following beneficial effects:

The metasurface-based structured light 3D imaging method provided by the invention realizes modulation of the multi-mode edge-emitting laser and the vertical-cavity surface-emitting laser array, improves system power and light field control quality, and improves the structured light 3D imaging precision, operating range and anti-interference capacity together with related structured light projection and demodulation methods. In addition, the system provided by the invention has small size and a low cost, and improves the above performance without significantly changing the size and cost.

DETAILED DESCRIPTION OF THE PREFERRED EMBODIMENT

The invention will be described in detail below in conjunction with accompanying drawings.

Figure 1:
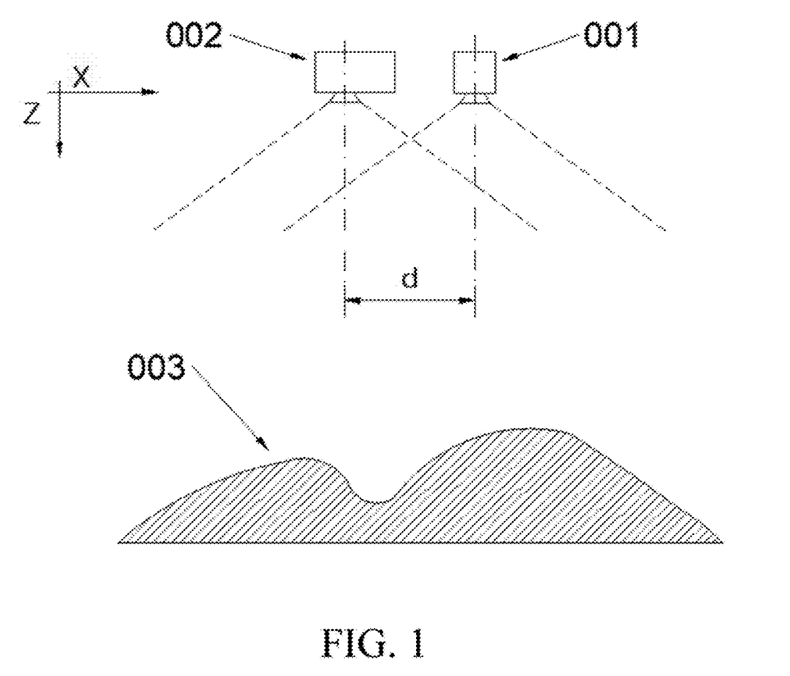
FIG. 1 is structural view of a 3D imaging system, wherein: 001, camera system; 002, structured light projector; 003, target object.

Referring to FIG. 1, a metasurface-based structured light 3D imaging system is arranged above a target object 003 and at least comprises a metasurface-based structured light projector 002 and a camera system 001 for acquiring a structured light.

Figure 2:
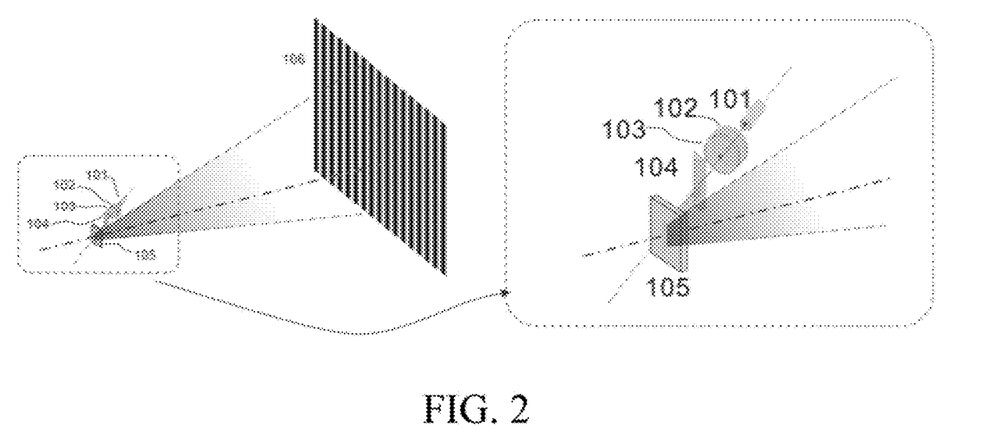
FIG. 2 is a system structure view of a metasurface-based structured light projector, wherein: 101, semiconductor laser; 102, beam homogenizer; 103, condenser; 104, cylindrical mirror; 105, MEMS micromirror; 106, structured light pattern.

Referring to FIG. 2, the structured light projector 002 comprises a semiconductor laser 101 used as a light source, and a beam homogenizer 102, a condenser 103, a cylindrical mirror 104 and a MEMS micromirror 105 are sequentially arranged in front of the semiconductor laser 101 in an incident direction.

The camera system 001 at least comprises a photosensitive unit and an optical system, forms a complete imaging unit and synchronously acquires a structured light pattern 106 projected to the surface of the target object 003.

Micro-nano structures, which are fabricated by lithography, electron beam processing or nanoimprint lithography, are arranged on surfaces of the beam homogenizer 102 and the condenser 103. The beam homogenizer 102 makes a reciprocating tangential translatory motion slightly or rotates around an axial slightly, by several micrometers, to further weaken laser speckles to improve the quality of a projected light field.

The micro-nano structures are formed by discrete nano-unit structural materials. The micro-nano structures are arranged on the surface of the beam homogenizer 102 and formed by discrete nano-unit structural materials. According to the wavelength of an incident laser light, different materials are selected. Within the infrared band, Ge or Si is used as the unit structural material; within the visible light band, $TiO_2$ or GaN is used as the unit structural material; and within the ultraviolet band, $HfO_2$ or AlN is used as the unit structural material. By adjusting characteristic parameters of nano-units, the phase and vibration direction of light waves can be controlled. Control of the whole light field is realized by arranging the nano-units with different characteristic parameters in two dimensions. In some implementations, light waves are modulated by changing the scale proportion of nano-rods in different directions, such as parameters P and H in the left diagram in FIG. 8. In some other implementations, light waves are controlled by adjusting the angle and arm length of a V-type antenna, such as parameters a and L in the right diagram.

Figure 3:
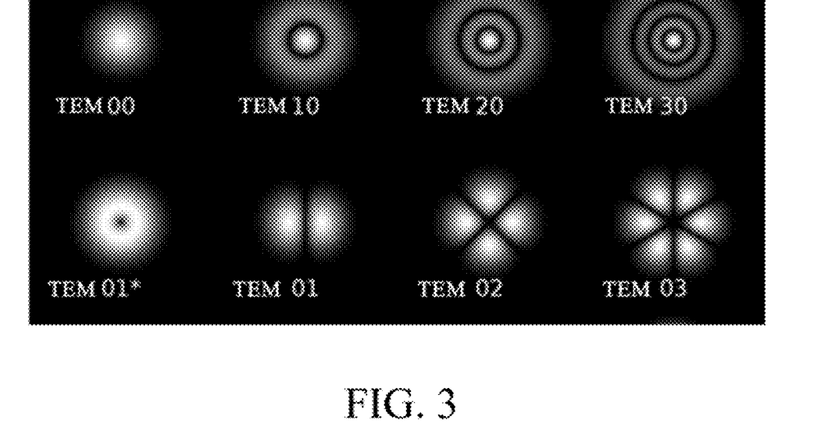
FIG. 3 is a picture of light spots of a multi-mode laser.
Figure 4:
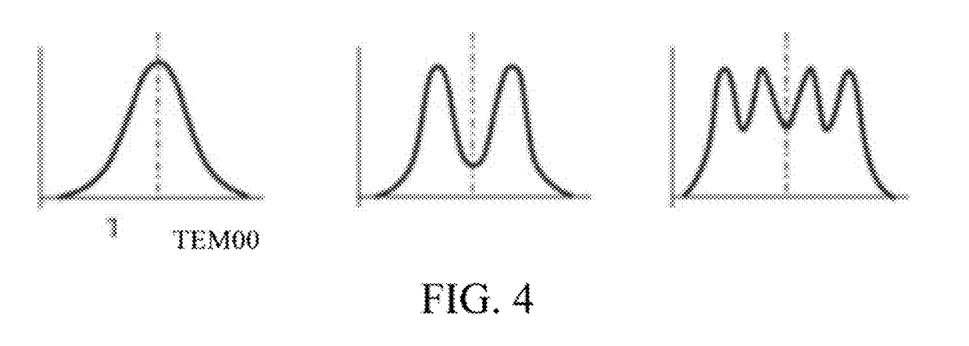
FIG. 4 is a sectional view of light spots of the multi-mode laser.
Figure 5:
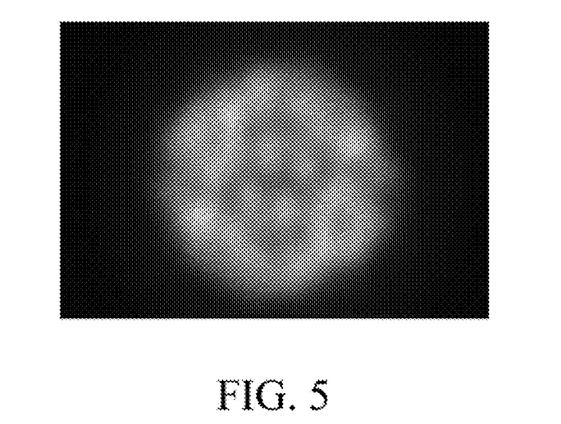
FIG. 5 is a picture of light spots of a vertical-cavity surface-emitting laser array.

The semiconductor laser 101 is either a multi-mode edge-emitting laser EEL or a vertical-cavity surface-emitting laser array (VCSELs), which is beneficial for improving the power and robustness of the system and expanding the operating range of the system. The semiconductor laser 101 may also be replaced with other types of lasers, without affecting the effect of this patent. In most existing schemes, a single-mode laser is often used, and a picture of light spots of the single-mode laser is shown by TEM00 in FIG. 3. A picture of light spots of a multi-mode edge-emitting laser is shown in FIG. 3, and a cross-sectional view of the energy distribution of light spots of the single-mode laser and the multi-mode edge-emitting laser is shown in FIG. 4. A picture of light spots of the vertical-cavity surface-emitting laser array (VCSELs) is shown in FIG. 5. Due to the complex light spot pattern of the multi-mode edge-emitting laser and the VCSELs, it is difficult to shape laser lights emitted by the multi-mode edge-emitting laser and the VCSELs into a high-quality Gaussian laser beam through a traditional method.

Figure 6:
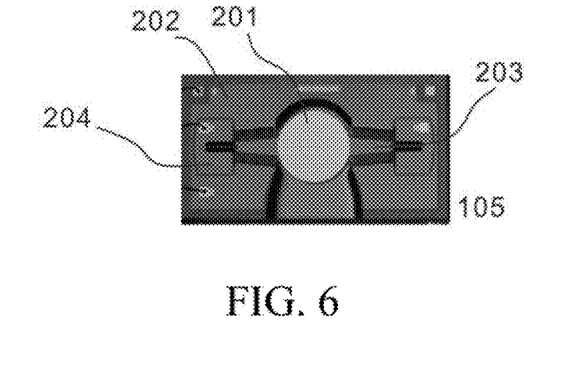
FIG. 6 is a picture of a real MEMS micromirror, wherein: 201, reflecting mirror; 202, base; 203, rotating shaft; 204, support structure.

The MEMS micromirror 105 is an electromagnetically-driven, electrothermally-driven or electrostatically-driven MEMS micromirror, and is preferably an electrostatically-driven MEMS micromirror which has a smaller size and temperature drift. As shown in FIG. 6, the MEMS micromirror 105 at least comprises a reflecting mirror 201, a base 202, a rotating shaft 203 and a support structure 204, wherein the reflecting mirror 201 is coated by metal deposition, and a suitable metal is selected according to the wavelength of the semiconductor laser. Within the visible light band, Au or Ag is preferred; and within the short-wave band and the ultraviolet band, Al is preferred. A comb structure is arranged on the rotating shaft 203, and under the action of an external current, a driving force can be provided for simple harmonic vibrations.

An imaging method according to the metasurface-based structured light 3D imaging system comprises the following steps:

S1: the metasurface-based structured light 3D imaging system is constructed;

Wherein, the metasurface-based structured light 3D imaging system is arranged above a target object 003 and at least comprises a metasurface-based structured light projector 002 and a camera system 001 for acquiring a structured light; the structured light projector 002 comprises a semiconductor laser 101 used as a light source, and a beam homogenizer 102, a condenser 103, a cylindrical mirror 104 and a MEMS micromirror 105 are sequentially arranged in front of the semiconductor laser 101 in an incident direction; the camera system 001 synchronously acquires a structured light pattern 106 projected to the surface of the target object 003;

S2: a structured light projection scheme is designed;

S3: a structured light projection system is controlled to project a structured light, and a structured light image is acquired synchronously; and S4: feature extraction and 3D reconstruction are completed.

Figure 9:
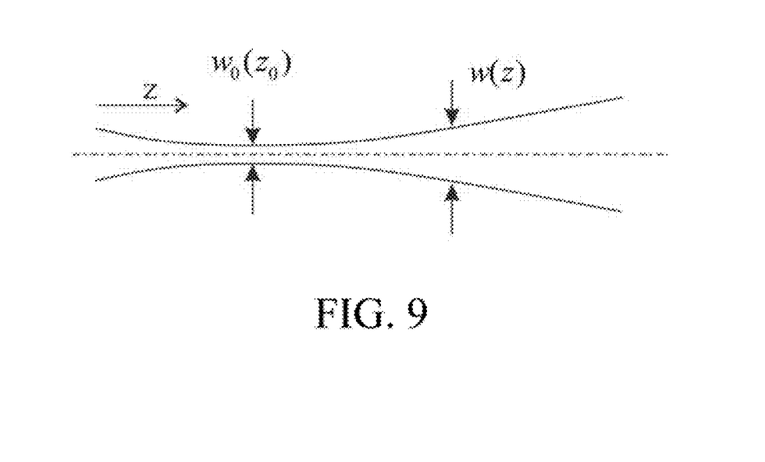
FIG. 9 illustrates a propagation model of a Gaussian beam.
Figure 10:
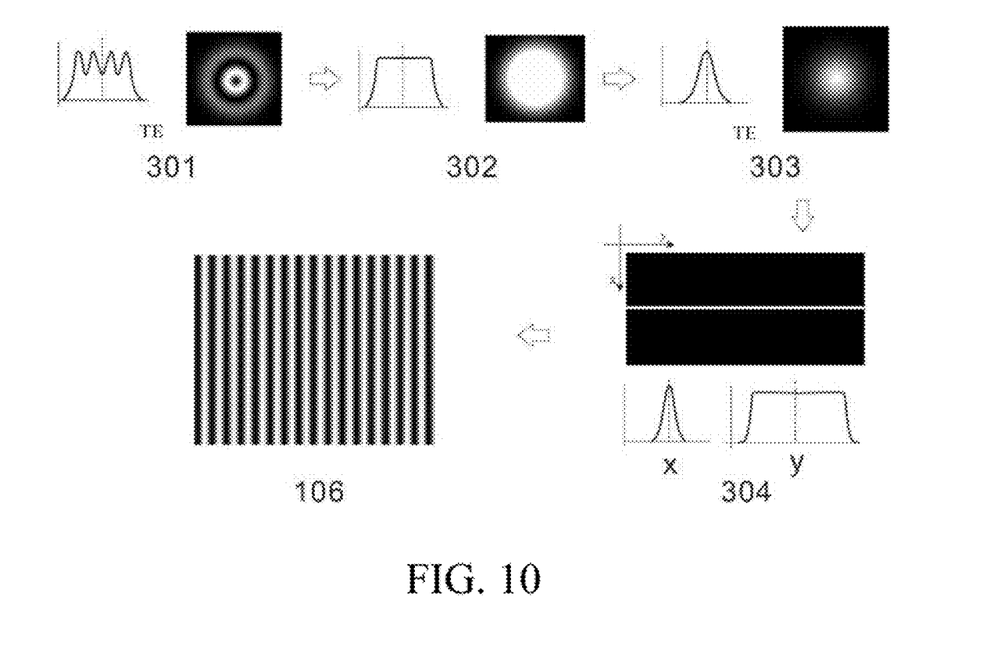
FIG. 10 is a flow diagram of light field modulation.

S1 specifically comprises the following steps:

As shown in FIG. 1, a laser beam 301 generated by a multi-mode edge-emitting or vertical-cavity surface-emitting semiconductor laser 101 penetrates through a beam homogenizer 102, and the beam homogenizer makes a reciprocating tangential translatory motion slightly or rotates around an axial slightly to further weaken laser speckles to improve the quality of a projected light field, wherein the motion amplitude ranges from 1 µm to 1000 µm, and the motion frequency ranges from 50 Hz to 5000 Hz; many nano-micro structures are arranged on the surface of the beam homogenizer 102 to change the phase and vibration direction of light waves, and after the light waves penetrate through the beam homogenizer 102, energy is homogenized, and the vibration direction becomes random, such that the coherence is destroyed; laser lights enter a condenser 103 after passing through the beam homogenizer 102, and the condenser 103 converges and shapes the laser lights into a Gaussian beam by means of the nano microstructures on the surface of the condenser 103, wherein a propagation model of the formed Gaussian laser beam is shown in FIG. 9, and a mathematical model of the propagation model is:

$$w(z) = w_0 \sqrt{1 + \left(M^2 \frac{(z-z_0)\lambda}{\pi w_0^2}\right)}, M^2 \geq 1$$

Where, w(z) is the Gaussian laser beam, the beam propagates in a z direction, $w_0$ is the diameter of a beam waist, a z value of the beam waist is $z_0$, $M^2$ is a parameter related to the laser beam, and for a desired Gaussian laser beam, $M^2=1$. A is the wavelength of the light waves, and w(z) is the Gaussian laser beam.

Further, after passing through a cylindrical mirror 104, the beam is stretched and finally is scanned by a MEMS micromirror 105 to form a projected structured light pattern 106.

After being stretched by the cylindrical mirror 104, the Gaussian laser beam forms a uniform laser knife structure, that is, the laser beam is linearly distributed in an x-y plane; the laser beam enters the MEMS micromirror 105 and is then further reflected to the surface of a measured target object 003, the MEMS micromirror 105 is driven to make simple harmonic motions around an axis to drive the laser beam to scan the surface of the object, the brightness of the laser is adjusted synchronously, and the structured light pattern 106 coded in one dimension and distributed in two dimension is projected to the surface of the target object 003.

Figure 7:
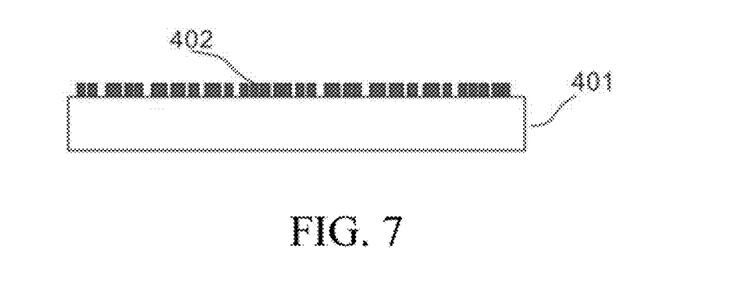
FIG. 7 illustrates a metasurface control device, wherein: 401, substrate; 402, nano-unit.
Figure 8:
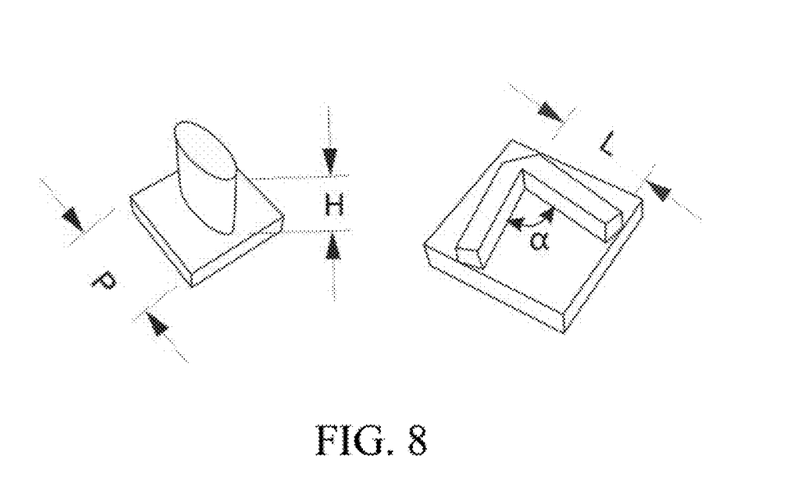
FIG. 8 illustrates structural diagrams of two nano-units.

As shown in FIG. 7 which illustrates the basic structure of the beam homogenizer and the condenser, the beam homogenizer and the condenser are each composed of a substrate 401 and nano-units 402 arranged on the substrate 401. The phase and vibration direction of light waves can be controlled by adjusting the characteristic parameters of the nano-units. By adjusting characteristic parameters of nano-units, the phase and vibration direction of light waves can be controlled. Control of the whole light field is realized by arranging the nano-units with different characteristic parameters in two dimensions. In some implementations, light waves are modulated by changing the scale proportion of nano-rods in different directions. In some other implementations, light waves are controlled by adjusting the angle and arm length of a V-type antenna. These two structures are shown in FIG. 8.

In order to focus all lights to the same focal point by the condenser 103, the phase of the light waves needs to follow the following phase distribution $\varphi_{nf}(x,y)$ to converge the laser lights into a Gaussian laser beam:

$$\varphi_{nf}(x, y) = \frac{2\pi}{\lambda}\left(f - \sqrt{x^2 + y^2 + f^2}\right)$$

Where, $\varphi_{nf}(x,y)$ is the phase distribution of the Gaussian laser beam, $\lambda$ is the wavelength of the incident light, and f is the focal length. x and y are positional coordinates of the cross-section of the laser beam.

The distribution of the nano-units is designed to realize the phase distribution $\varphi_{nf}(x,y)$ to converge the laser lights into the Gaussian laser beam.

S2 specifically comprises the following steps:

S2-1: the form of a structured light code is determined

Because the MEMS micromirror in S1 has only one rotating shaft, only structured lights coded in one dimension can be projected, and structured lights comprises single-line structured light, multi-line structured light, Gray-code structured light, trigonometric function-code structured light and a combination of thereof. A suitable structured light code is selected based on the following two factors: (1) different structured light codes are suitable for different scenarios, wherein the line structured light has good adaptivity to different reflecting surfaces, but it has low efficiency; the Gray-code structured light can realize full-field 3D measurement, but it has low precision and cannot resist motion blurs; the trigonometric function-code structured light, as compared with the line structured light and the Gray code structured light, has poor adaptivity to reflecting surfaces, but it has high precision and can resist motion blurs; and (2) considering the loss of the structured light 3D imaging system constructed in S1, the code pattern should still meet requirements after projected and lowpass filtered.

S2-2: parameters of the code are determined

The Gaussian laser beam generated by the selected structural light in S1 is driven by the MEMS micromirror 105 to perform scanning, which is equal to convolution in a spatial domain, and according to the convolution theorem, the convolution in the spatial domain corresponds to a product in a frequency domain. The selected structured light code pattern is converted to the frequency domain by Fourier transform, and is multiplied by the actual Gaussian laser beam parameter w(z) in S1 to obtain a filtered frequency component, and then, a structured light code suitable for constructing the structured light 3D imaging system in S1 is selected.

Because the Gaussian laser beam generated in Si can be regarded as a two-dimensional Gaussian filter, the spatial domain and the frequency domain can be described as:

$$\begin{cases} g_{psf}(x, y) = \frac{1}{2\pi\sigma^2}\exp\left(-\frac{x^2 + y^2}{2\sigma^2}\right) \\ G_{psf}(\xi, \eta) = \exp\left[-\pi^2\sigma^2(\xi^2 + \eta^2)\right] \end{cases}$$

Wherein, $g_{psf}(x,y)$ is a description of the spatial domain, $G_{psf}(\xi,\eta)$ is a description of the frequency domain, $\xi$ and $\eta$ are frequency-domain coordinates, and $\sigma$ is a diffusion parameter.

$\sigma=kw(z)$, where k is a system-related constant. A single laser light (impulse function), a Gray code (square wave function), or a sine or cosine fringe projection (cosine function) is converted to the frequency domain by Fourier series expansion. A projected structured light image is marked as f(x,y), the Fourier transform is marked as $F(\xi,\eta)$, and the frequency domain of the image scanned and filtered by the beam is: $I(\xi,\eta):I(\xi,\eta)=F(\xi,\eta)*G_{psf}(\xi,\eta)$.

Using the method to analyze whether the structured light pattern can be projected by the above-mentioned system is described here using the sine or cosine fringe projection as the structured light, by way of example.

For a cosine function:

$$f(\omega_0 t) = a\cos(\omega_0 t) = \frac{a}{2}\left(e^{j\omega_0 t} + e^{j\omega_0 t}\right)$$

The Fourier transform is: $F(\omega)=a\pi\delta(\omega-\omega_0)+a\pi\delta(\omega+\omega_0)$
Where, $\delta$ is a Dirac function.
Only one dimension is taken into account:

$I(\xi)=F(\xi)*G_{psf}(\xi)=\exp(-\pi^2k^2w(z)^2\xi^2)[a\pi(\xi-\xi_0)+a\pi(\xi+\xi_0)]$ By performing similar transform on different structured lights, losses generated after the structured lights are projected under the same laser beam can be compared to select a structured light suitable for the system.

A sine or cosine-code structured light is preferred because it has a small loss after being filtered by the scanning beam.

In conjunction with the threshold of a frequency loss, for example, $G_{psf}(\xi_0)>0.8$, the maximum spatial frequency of a projected fringe can be determined by giving a diameter $w_0$ of a beam waist of a laser beam; on the contrary, the requirement for the beam can be obtained by giving a spatial frequency to be projected, that is, the value of the diameter $w_0$ of the beam waist. In this way, the projection cycle of the sine or cosine code or the projection frequency of the Gray code can be determined to obtain an optimal projection effect and guarantee the precision.

With a cosine structured light as an example, after the optimal spatial frequency $\xi_0$ is determined, a projected structured light signal is $I(x):I(x)=A\cos(2\pi\xi_0 x+\varphi)+B$ Where, A and B are constant for transforming I(x) to a drive current threshold range of the laser, and $\varphi$ is a given phase shift.

S3 specifically comprises:

D3-1: a driver of the MEMS micromirror is started to generate a sine current signal with a resonant frequency $f_{mirror}$ according to the resonant frequency $f_{mirror}$ of the MEMS micromirror; the current signal is applied to two electrodes of an electrostatic MEMS drive structure of the MEMS micromirror, such that the MEMS micromirror is excited to make simple harmonic vibrations until the MEMS micromirror becomes stable;

After a coding scheme is determined, the structured light code is discretized, a one-dimensional code pattern can be expressed by an array with a fixed length, and the array is used for controlling the current of the laser, and is [1,n]; then, according to the number of codes to be projected, a complete coding scheme is P[N,n]; considering the non-uniform velocity of the simple harmonic motion, P is corrected.

In some cases where the cosine structured light designed in S2-2 is used, an $i^{th}$ frame of the structured light is $I_i(x)$:

$I_i(x)=P(i,1:n)\circ$

Specifically, assume a projection cycle is T and a frame period is frame $T_{frame}$, $T=N \times T_{frame}$;

A cycle-start synchronizing signal $S_{T\text{-}start}$ is emitted at the beginning of T, and a cycle-end synchronizing signal $S_{T\text{-}end}$ is emitted at the end of T; a frame-start synchronizing signal is emitted at the beginning of $T_{frame}$, and a frame-end synchronizing signal $S_{f\text{-}end}$ is emitted at the end of $T_{frame}$; the beginning of T is the beginning $t_0$ of a simple harmonic motion, the first frame period $T_{frame}$ is aligned with $t_0$, the end of $T_{frame}$ is the end of K simple harmonic motions, and the cycle T ends at the end of $N*K(T_{frame})$ simple harmonic motions;

S3-2: at $S_{T\text{-}start}$ of each cycle T, a control system of the structured-light projector 002 sends P(1,1:n) to the driver of the semiconductor laser 101, the driver performs digital-to-analog conversion and amplification on the array P(1,1:n) to generate a current signal, and the current signal is applied to two electrodes of the semiconductor laser 101 to drive the laser to generate an image with corresponding brightness; when the signal $S_{f\text{-}start}$ of the next frame is received, the same operation as P(1,1:n) is performed on P(2,1:n), and the process is repeated until projection of P(N,1:n) is completed;

S3-3: during acquisition of the camera system 001, wait for the next closest $S_{T\text{-}start}$, and then camera exposure is started at $S_{f\text{-}start}$ and is ended at $S_{f\text{-}end}$ until all images of 1→N within T are acquired.

S4 specifically comprises the following steps;

S4-1: before the first time of construction, the metasurface-based structured-light 3D imaging system needs to be calibrated, wherein internal parameters to be calibrated comprise the focus length, resolution, pixel size, main point position and distortion parameter of the camera system 001; external parameters comprise the distance between an optical center of the camera system 001 and an optical center of the structured-light projector 002 and the angle between an optical axis of the camera system 001 and an optical axis of the structured-light projector 002;

S4-2: the image acquired in S3 is analyzed to extract corresponding features, and a depth image is calculated in conjunction with the parameters in S4-1.

Specifically, a wrapped phase φ(x,y) is calculated by means of a cosine structured-light code using a phase shifting method, and then phase unwrapping is performed using a multi-frequency unwrapping method to obtain an absolute phase Φ(x,y).

In some other embodiments where a cosine structured light is projected, the wrapped phase φ(x,y) and the absolute phase Φ(x,y) are obtained using a learning-based method.

Depth mapping conversion Φ(x,y)→h(x,y) is performed on data calibrated in S4-1: h(x,y) is converted into a depth image D(u,v) in the form of an unsigned integer by uint16 or uint32 conversion, to facilitate transmission and storage, and the depth image D(u,v) is sent to an upper computer.

S4-3: 3D reconstruction is performed on a point cloud using the depth image D(u,v) in S4-2 in conjunction with parameters in S4-1, and a world coordinate $(x_w, y_w, z_w)$ is reconstructed by:

$$\begin{cases} x_w = \dfrac{D(u,v)(u - u_0)}{f_x} \\ y_w = \dfrac{D(u,v)(v - v_0)}{f_y} \\ z_w = D(u,v) \end{cases}$$

Where, $f_x$ and $f_y$ are a focal length in an x direction and a focal length in a y direction, $u_0$, $v_0$ are pixel coordinates of the main point position, and u, v are pixel coordinates.

What is claimed is:

1. A metasurface-based structured light 3D imaging system, being arranged above a target object (003) and at least comprising a metasurface-based structured light projector (002) and a camera system (001) for acquiring a structured light, wherein:

the structured light projector (002) comprises a semiconductor laser (101) used as a light source, and a beam homogenizer (102), a condenser (103), a cylindrical mirror (104) and a MEMS micromirror (105) are sequentially arranged in front of the semiconductor laser (101) in an incident direction;

the camera system (001) at least comprises a photosensitive unit and an optical system, forms a complete imaging unit, and synchronously acquires a structured light pattern (106) projected to a surface of the target object (003);

the semiconductor laser (101) is either a multi-mode edge-emitting laser EEL or a vertical-cavity surface-emitting laser array VCSELs; a laser beam (301) generated by the multi-mode edge-emitting laser EEL or the vertical-cavity surface-emitting laser array VCSELs first penetrates through the beam homogenizer (102), the beam homogenizer a reciprocating tangential translatory motion slightly or rotates around an axial slightly, wherein a motion amplitude ranges from 1 μm to 1000 μm, and a motion frequency ranges from 50 Hz to 5000 Hz; nano-micro structures are arranged on a surface of the beam homogenizer (102) to change a phase and vibration direction of light waves, and after the light waves penetrate through the beam homogenizer (102), energy is homogenized, and the vibration direction becomes random, such that coherence is destroyed; laser lights enter the condenser (103) after passing through the beam homogenizer (102), and the condenser (103) converges and shapes the laser lights into a Gaussian beam by means of nano micro-structures on a surface of the condenser (103); after being stretched by the cylindrical mirror (104), the Gaussian laser beam forms a uniform laser knife structure, that is, the laser beam is linearly distributed in an x-y plane; the laser beam enters the MEMS micromirror (105) and is then further reflected to the surface of the measured target object (003), the MEMS micromirror (105) is driven to make simple harmonic motions around an axis to drive laser lights to scan the surface of the object, the brightness of the laser is adjusted synchronously, and the structured light pattern (106) coded in one dimension and distributed in two dimension is projected to the surface of the target object (003);

the phase of the light waves of the condenser (103) needs to follow the following phase distribution $\varphi_{nf}(x,y)$ to converge the laser lights into a Gaussian laser beam, and the phase distribution required for forming the Gaussian laser beam is:

$$\varphi_{nf}(x,y) = \frac{2\pi}{\lambda}\left(f - \sqrt{x^2 + y^2 + f^2}\right)$$

where, $\varphi_{nf}(x,y)$ is a phase distribution of the Gaussian laser beam, λ is a wavelength of an incident light, and f is a focal length, x and y are positional coordinates of a cross-section of the laser beam;

a distribution of the nano-units is designed to realize the phase distribution $\varphi_{nj}(x,y)$ to converge the laser lights into the Gaussian laser beam;

a mathematical model of a propagation model of the Gaussian laser beam is:

$$w(z) = w_0 \sqrt{1 + \left(M^2 \frac{(z-z_0)\lambda}{\pi w_0^2}\right)}, M^2 \geq 1$$

where, the beam propagates in a z direction, $w_0$ is a diameter of a beam waist, a z value of the beam waist is $z_0$, $M^2$ is a parameter related to the laser beam, and for a desired Gaussian laser beam, $M^2=1$, $\lambda$ is a wavelength of the light waves, and $w(z)$ is the Gaussian laser beam.

2. The metasurface-based structured light 3D imaging system according to claim 1, wherein micro-nano structures are arranged both on the surface of the beam homogenizer (102) and the surface of the condenser (103), and are fabricated by lithography, electron beam processing or nano-imprint lithography.

3. The metasurface-based structured light 3D imaging system according to claim 2, wherein the micro-nano structures are formed by discrete nano-unit structural materials; within an infrared band, Ge or Si is used as the unit structural material; within a visible light band, $TiO_2$ or GaN is used as the unit structural material; and within an ultraviolet band, $HfO_2$ or AlN is used as the unit structural material.

4. The metasurface-based structured light 3D imaging system according to claim 1, wherein the MEMS micromirror (105) is an electromagnetically-driven, electrothermally-driven or electrostatically-driven MEMS micromirror.

5. An imaging method based on the metasurface-based structured light 3D imaging system method according to claim 1, comprising the following steps:

S1: constructing the metasurface-based structured light 3D imaging system;

S2: designing a structured light projection scheme;

S3: controlling the structured light 3D imaging system to project a structured light, and synchronously acquiring a structured light image; and S4: complecting feature extraction and 3D reconstruction.

6. The imaging method according to claim 5, wherein S2 specifically comprises:

S2-1: determining the form of a structured light code:

selecting a suitable structured light code based on the following two factors: (1) line structured light is suitable for different reflecting surfaces, Gray-code structured light is able to realize full-field 3D measurement, and trigonometric function-code structured light is high in precision; (2) considering a loss of the structured light 3D imaging system constructed in S1, a code pattern should still meet requirements after being projected and lowpass filtered; and S2-2: determining parameters of the code:

driving a selected structural light by a Gaussian laser beam and the MEMS micromirror (105) to perform scanning, which is equal to convolution in a spatial domain, and according to the convolution theorem, the convolution in the spatial domain corresponds to a product in a frequency domain; converting the selected structured light code pattern to the frequency domain by Fourier transform, and multiplying the code pattern by an actual Gaussian laser beam parameter w(z) to obtain a filtered frequency component, and then, selecting a structured light code suitable for constructing the structured light 3D imaging system in Si;

after a coding scheme is determined, discretizing the structured light code, wherein a one-dimensional code pattern is expressed by an array with a fixed length, and the array is used for controlling a current of the laser, and is [1,n]; then, obtaining a complete coding scheme P[N,n] according to the number of codes to be projected; and considering the non-uniform velocity of the simple harmonic motion, correcting P.

7. The imaging method according to claim 5, wherein S3 specifically comprises:

D3-1: starting a driver of the MEMS micromirror (105) to generate a sine current signal with a resonant frequency $f_{mirror}$ according to the resonant frequency $f_{mirror}$ of the MEMS micromirror (105); applying the current signal is applied to two electrodes of an electrostatic MEMS drive structure of the MEMS micromirror (105), such that the MEMS micromirror is excited to make simple harmonic vibrations until the MEMS micromirror becomes stable;

specifically, assume a projection cycle is T and a frame period is $T_{frame}$, $T=N\times T_{frame}$;

emitting a cycle-start synchronizing signal $S_{T-start}$ at the beginning of T, and emitting a cycle-end synchronizing signal $S_{T-end}$ at the end of T; emitting a frame-start synchronizing signal at the beginning of $T_{frame}$, and emitting a frame-end synchronizing signal $S_{f-end}$ at the end of $T_{frame}$; the beginning of T is a beginning $t_0$ of one simple harmonic motion, the first frame period $T_{frame}$ is aligned with $t_0$, the end of $T_{frame}$ is the end of K simple harmonic motions, and the cycle T ends at the end of $N*K(T_{frame})$ simple harmonic motions;

S3-2: at $S_{T,start}$ of each cycle T, sending, by a control system of the structured-light projector (002), P(1,1:n) to a driver of the semiconductor laser (101), performing, by the driver, digital-to-analog conversion and amplification on the array P(1,1:n) to generate a current signal, and applying the current signal to two electrodes of the semiconductor laser (101) to drive the laser to generate an image with corresponding brightness; when the signal $S_{f-start}$ of the next frame is received, performing the same operation as P(1,1:n) on P(2,1:n), and repeating the process until projection of P(N,1:n) is completed; and S3-3: during acquisition of the camera system (001), waiting for the next closest $S_{T-start}$, and then starting camera exposure at $S_{f-start}$ and ending the camera exposure at $S_{f-end}$ until all images of 1→N within T are acquired.

8. The imaging method according to claim 5, wherein S4 comprises the following specific steps:

S4-1: before the first time of construction, calibrating the metasurface-based structured-light 3D imaging system, wherein internal parameters to be calibrated comprise a focus length, resolution, pixel size, main point position and distortion parameter of the camera system (001); external parameters comprise a distance between an optical center of the camera system (001) and an optical center of the structured-light projector (002) and an angle between an optical axis of the camera system (001) and an optical axis of the structured-light projector (002);

S4-2: analyzing the image acquired in S3 to extract corresponding features, and calculating a depth image in conjunction with the parameters in S4-1;

specifically, calculating a wrapped phase φ(x,y) by means of cosine structured-light projection using a phase shifting method, and then performing phase unwrapping using a multi-frequency unwrapping method to obtain an absolute phase Φ(x, Y);

performing depth mapping conversion Φ(x,y)→h(x,y) on data calibrated in S4-1: converting h(x,y) into a depth image D(u,v) in the form of an unsigned integer by uint16 or uint32 conversion, and sending the depth image D(u, v) to an upper computer; and S4-3: performing 3D reconstruction on a point cloud using the depth image D(u,v) in S4-2 in conjunction with parameters in S4-1, and reconstructing a world coordinate $(x_w, y_w, z_w)$ by:

$$\begin{cases} x_w = \dfrac{D(u, v)(u - u_0)}{f_x} \\ y_w = \dfrac{D(u, v)(v - v_0)}{f_y} \\ z_w = D(u, v) \end{cases}$$

where, $f_x$ and $f_y$ are a focal length in an x direction and a focal length in a y direction, $u_0$, $v_0$ are pixel coordinates of the main point position, and u, v are pixel coordinates.

* * * * *